(No Model.)

J. A. LOVETTE.
BAND CUTTER AND FEEDER ATTACHMENT.

No. 573,019. Patented Dec. 15, 1896.

Inventor
John A. Lovette,

Witnesses
L. J. Koerth.
V. B. Hillyard.

By his Attorneys,
C. A. Snow & Co.

UNITED STATES PATENT OFFICE.

JOHN ALEXANDER LOVETTE, OF MANHATTAN, KANSAS.

BAND-CUTTER AND FEEDER ATTACHMENT.

SPECIFICATION forming part of Letters Patent No. 573,019, dated December 15, 1896.

Application filed March 31, 1896. Serial No. 585,640. (No model.)

*To all whom it may concern:*

Be it known that I, JOHN ALEXANDER LOVETTE, a citizen of the United States, residing at Manhattan, in the county of Riley and State of Kansas, have invented a new and useful Band-Cutter and Feeder Attachment, of which the following is a specification.

The purpose of this invention is to prevent choking of threshing-cylinders by feeding the grain thereto in too great quantity. This is especially desirable in the event of the grain being damp, as provision is had to adjust the regulator so that the grain will be fed uniformly to the threshing-cylinder no matter whether the conveyer or elevator is supplied in large or small quantities. The regulator while controlling the quantity and amount of grain fed to the thresher also lightens and loosens the grain and throws the surplus amount toward the receiving end of the conveyer or elevator.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1:
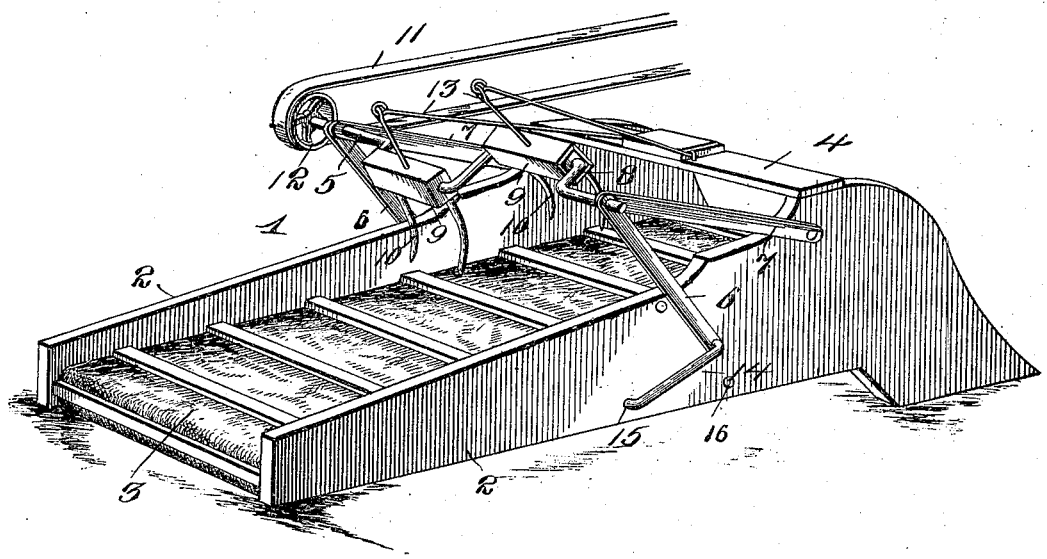
Figure 2:
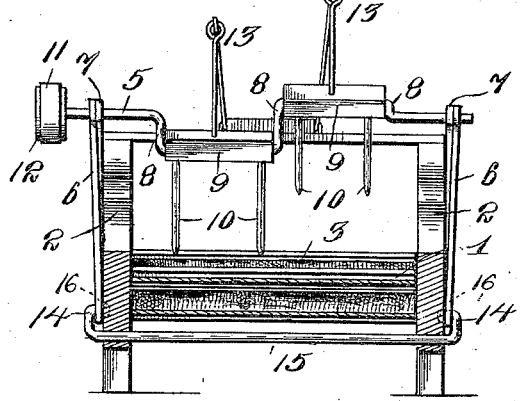
Figure 3:
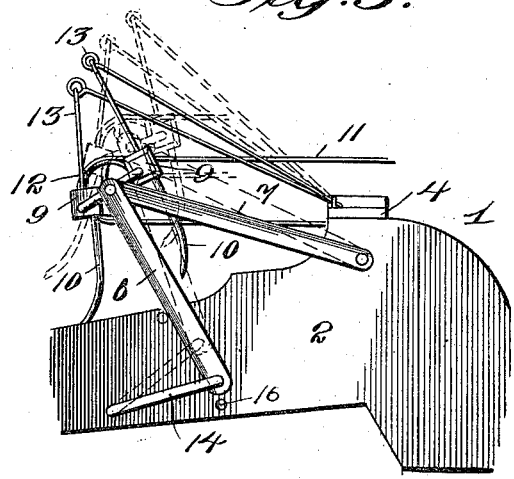

Figure 1 is a perspective view of a feeder for threshing-machines of ordinary construction having the invention applied thereto. Fig. 2 is a transverse section about on the line of the forks. Fig. 3 is a detail view in side elevation, showing an adjusted position of the forks by dotted lines.

Corresponding and like parts are referred to in the following description and designated in the several views of the accompanying drawings by the same reference-characters.

The feeder shown is of ordinary construction and the grain may be supplied thereto in forkfuls from a wagon or in bound bundles, and in the latter instance the feeder will be supplied with band-cutting apparatus of approved pattern and which is not shown, since it forms no part of the present invention. This feeder comprises a table 1, side pieces 2, and an endless conveyer or apron 3. A cross-bar 4 connects the side pieces near their delivery or rear ends. A shaft 5 is journaled near its ends in pivoted arms 6 and 7 and is provided with crank portions 8, which extend in diametrically opposite directions and upon which are journaled blocks 9, bearing forks 10, the tines of the forks facing the receiving end of the conveyer and the forks being disposed and operated so as to throw the surplus amount of grain away from the threshing-cylinder and toward the receiving end of the conveyer or elevator. This shaft 5 is rotated from a convenient part of the feeder or thresher by means of a belt 11, passing around a band-pulley 12 on the end of the shaft. If desired, both ends of the shaft may be similarly equipped for imparting motion thereto.

To give proper direction to the forks in their movements, rods 13 connect the upper ends of the forks with the cross-bar 4. By this disposition of the parts the active ends of the forks are caused to travel in an elliptical or orbital path and enter the grain toward the delivery end of the conveyer and leave the grain toward the receiving end of the said conveyer, the said ends moving forward or toward the receiving end of the conveyer while in engagement with the grain, thereby throwing the surplus amount of grain away from the thresher and insuring the latter being evenly and uniformly fed. By having the crank portions 8 of the shaft 5 disposed at diametrically opposite points the forks are alternately actuated, that is, while the one is moving forward the other is returning to its position to engage with the grain.

The arms 7 have pivotal connection with the side pieces 2, and their upper forward ends are apertured to receive the shaft 5, and the arms 6 are similarly apertured at their upper ends to receive the shaft 5 and have pivotal connection at their lower ends with the bent ends of arms 14 at the ends of a transverse rod or shaft 15, the latter being journaled in the side pieces 2. Upon turning the rod or shaft 15 in its bearings the arms 6, having connection with the arms 14 thereof, will be raised or lowered, thereby changing the elevation of the forks 10 and consequently regulating the distance between the active ends of the forks and the conveyer 3, whereby provision is had for regulating the amount of grain to be fed to the thresher in a given time, as will be readily understood. This shaft 15 can be turned in its bearings in any convenient way and will be held in the located position either by having the bent ends of the arms 14 to bind against or spring into openings 16 in the side pieces 2, or in any way found most convenient and practicable.

The regulator can be applied to any make or style of feeding attachment for threshers and can be adjusted while the feeder is in operation to increase or reduce the amount of grain fed to the threshing-cylinder, as required.

What I claim is—

In combination, a feeder for threshing-machines, a shaft having crank portions, forks journaled upon the crank portions of the shaft, rods having connection with the forks for giving proper direction thereto, arms having pivotal connection with the feeder and apertured to receive the aforesaid shaft, other arms receiving the said shaft, and a transverse rod having its end portions bent to form spring-arms to automatically engage with the sides of the feeder to hold the said shaft in an adjusted position, and having the terminal portions of the spring-arms bent inward to form pivotal connection with the lower ends of the last-mentioned arms, and adapted to be turned to adjust the crank-shaft to any required elevation, substantially as and for the purpose set forth.

In testimony that I claim the foregoing as my own I have hereto affixed my signature in the presence of two witnesses.

JOHN ALEXANDER LOVETTE.

Witnesses:
  C. M. DEPUTY,
  D. ADAMS.